United States Patent [19]

Colver et al.

[11] Patent Number: 5,560,573
[45] Date of Patent: Oct. 1, 1996

[54] PORTABLE DETACHABLE MEDITATION ARMREST SUPPORT

[75] Inventors: Howard Colver, Escondido; Klaus Liebig, Encinitas, both of Calif.

[73] Assignee: Self-Realization Fellowship Church, Los Angeles, Calif.

[21] Appl. No.: 524,520

[22] Filed: Sep. 7, 1995

[51] Int. Cl.⁶ .................................................. B68G 5/00
[52] U.S. Cl. ........................... 248/118; 248/188; 248/413; 248/918; 403/339
[58] Field of Search ................................. 248/118, 118.1, 248/118.3, 118.5, 918, 125.8, 413, 414, 418, 408, 409, 413, 125.1, 125.2, 125.3, 188.8, 188; 403/339, 340, 294, 296

[56] References Cited

U.S. PATENT DOCUMENTS

| | | | |
|---|---|---|---|
| 2,722,970 | 11/1955 | Stechman | 248/408 X |
| 2,927,757 | 3/1960 | Omohundre et al. | 248/413 |
| 3,592,434 | 7/1971 | Murray | 248/413 X |
| 3,819,198 | 6/1974 | Grover | 403/339 X |
| 4,018,217 | 4/1977 | Evans | 248/118 X |
| 4,140,415 | 2/1979 | Koyamato | 248/413 X |
| 5,484,124 | 1/1996 | Billings | 248/118 |

OTHER PUBLICATIONS

Flyer entitled Mediation Support (Adjustable Armrest)—use date Sep. 1994—product sold 1975–1994.
Flyer entitled Adjustable Armrest—use date printed and distributed between Aug. 1975 and May 1978.
Flyer entitled Adjustable Elbow Rest—use date printed and distributed prior to Aug. 1975.

*Primary Examiner*—Korie Chan
*Attorney, Agent, or Firm*—Poms, Smith, Lande & Rose Professional Corporation

[57] ABSTRACT

A portable detachable meditation armrest support including a pair of interconnected armrest supports, a pair of telescoping members, an adjustable sleeve encircling said members for adjusting the overall length forming a monopode, one of the supports having a threaded plug receivable in a hole in the other support forming a flat planar surface, and a threaded shank on the outer telescoping member receivable in the plug.

15 Claims, 3 Drawing Sheets

5,560,573

1

PORTABLE DETACHABLE MEDITATION ARMREST SUPPORT

BACKGROUND OF THE INVENTION

1. Field of the Invention

The invention relates to adjustable armrests for meditation, and particularly to a portable detachable meditation armrest support.

2. Description of the Prior Art

Adjustable armrests used for meditation are well known. One such support used in the past included a monopode adjustable support leg interconnected to a single flat planar armrest. Another such armrest used a telescoping leg interconnected to a pair of flat planar armrest supports at their junction and also connected by a brace to the ends of the supports.

There is a need for a simple, functional armrest which consists of only three preassembled pieces which are easy to assemble and take apart for travel or storage. Such an armrest should be easily and silently adjustable to vary the overall height.

SUMMARY OF THE INVENTION

It is an object of this invention to provide an improved adjustable armrest for meditation.

It is another object of this invention to provide such an armrest that can be disassembled into only three components, then quickly and easily assembled.

These and other objects are accomplished by providing a portable detachable meditation support including a pair of interconnected armrest supports, a pair of telescoping members, an adjustable sleeve encircling the members for adjusting the overall length forming a monopode, one of the supports having a threaded plug receivable in a hole in the other support thereby both interconnected supports forming a flat planar surface, and a threaded shank on the outer telescoping member receivable in the plug.

DESCRIPTION OF THE PREFERRED EMBODIMENT

Figure 1:
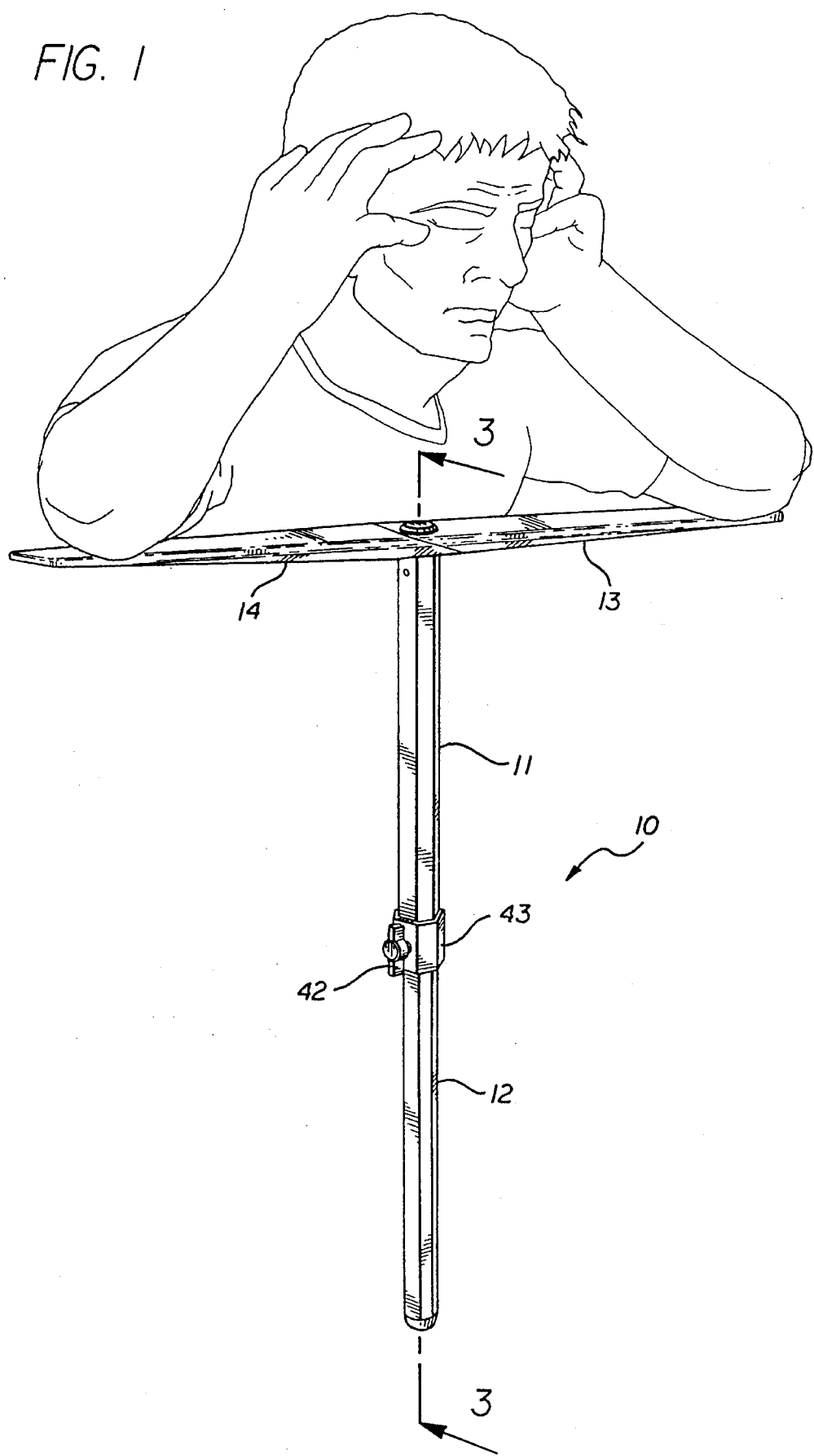
FIG. 1 is a perspective view of the armrest of the invention shown in use.

A portable detachable meditation armrest support 10 is shown in FIG. 1 in operative position whereby one places his or her upper arms on top of support members 13, 14, the latter being supported by a pair of adjustable interconnected telescoping support members 11, 12.

Figure 2:
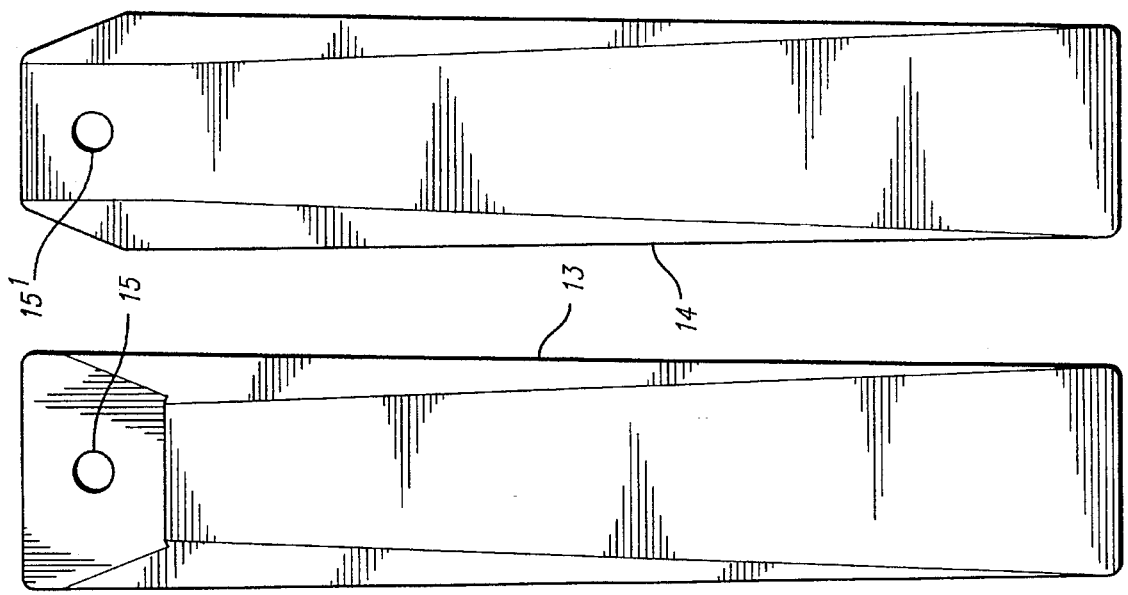
FIG. 2 is an exploded view of all parts making up the armrest of FIG. 1.
Figure 3:
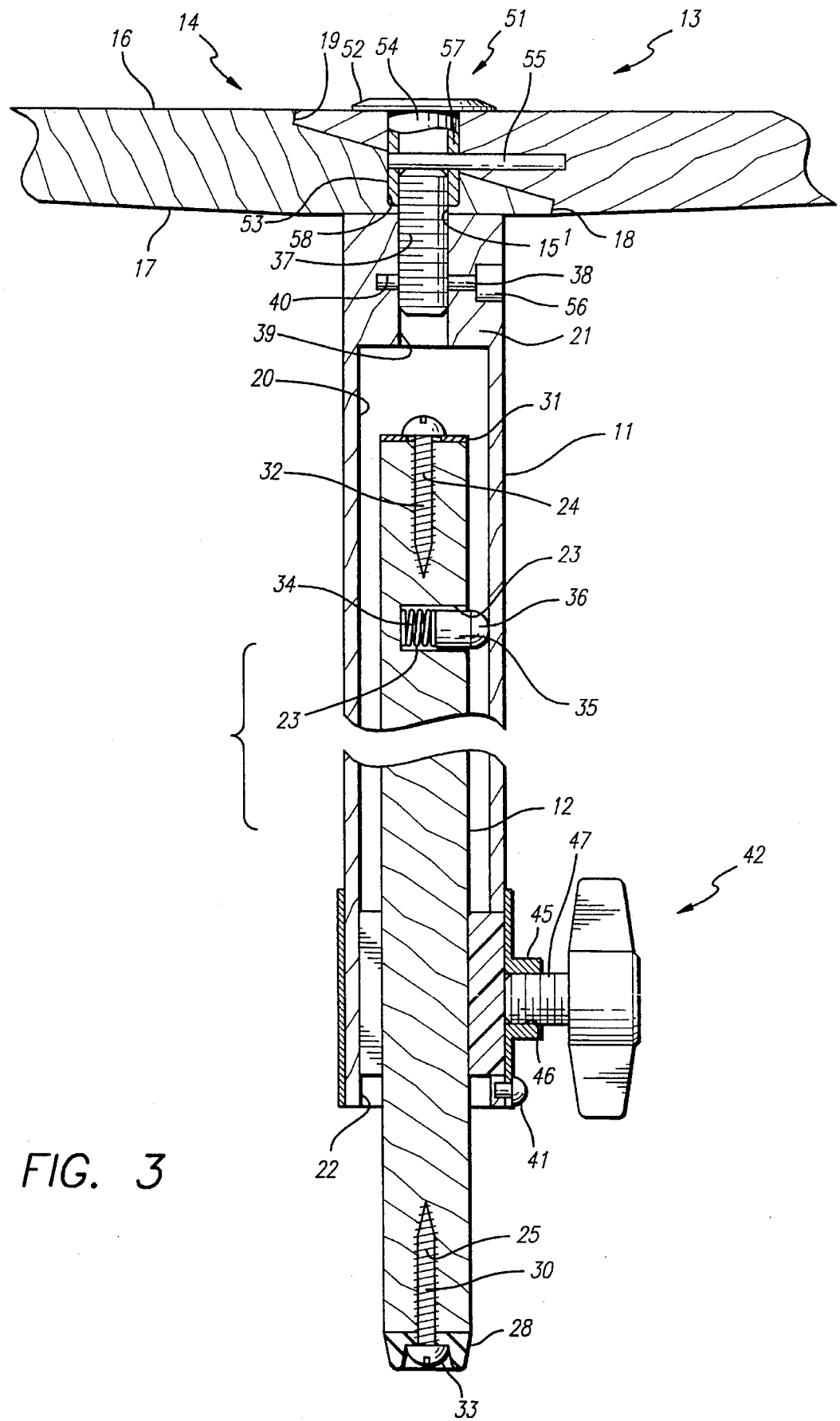
FIG. 3 is a sectional view taken along lines 3—3 of FIG. 1.

Support 10, prior to assembly, is shown in exploded view in FIG. 2. A pair of elongated planar armrest supports 13, 14 are provided. As seen in FIG. 2, each support 13, 14 tapers from one end to the other and includes a throughbore 15, 15', respectively, at its widest end. Throughbore 15' of support 14 closes slightly at its bottom end as seen in FIG. 3. As seen in FIG. 3, each support 13, 14 tapers at its widest end from its upper surface 16 to its lower surface 17. A shoulder 19 is formed at the junction of upper surface 16 and the tapered portion. The terminal end of each tapered portion is squared off as seen at each end 18. When reversed, one support, e.g., support 13, has its tapered portion conforming to the reversed tapered portion of the other support, e.g., support 14, the end 18 of one, e.g., end of support 13, abutting against the shoulder of the other support, e.g., support 14, all as shown in FIG. 3. Thus, the upper surface 16 of one support is flush with and lies in the same plane as the upper surface 16 of the other support when connected as seen in FIG. 3 and as will be discussed. Although not necessary to the invention, the lower surfaces 17 are also flush and in the same plane.

Referring again to FIG. 2, telescoping elongated support members 11, 12 are shown. Support member 12 is preferably a solid rod that is adapted to telescope inside of member 11, which is preferably hollow on its interior 20 (FIG. 3). Member 11 is closed off at one end by a solid portion 21 (FIG. 3) and open at its other end 22 to receive member 12 therein. As seen in FIG. 1, member 12 may be irregularly configured on its outer surface, e.g., hexagonal, and the interior 20 of member 11 is rounded but may be similarly configured. Also, member 11 may be so configured on its outer surface, as seen in FIG. 1, to assist in gripping the same.

Referring again to FIG. 2, a bore 23 is provided in one end of member 12 and, as seen in FIG. 3, extends only partway through member 12. A first hole 24 may be provided axially through one end of member 12 and a like second hole 25 may be provided at the other end.

Referring again to FIG. 2, member 11 has an oblong opening 26 formed in the outer face 27 of member 11. Since member 11 is hexagonally shaped on its outer surfaces, there are six outer faces similar to face 27. An oblong opening 26 is thus preferably formed in every other face 27 (two being shown in FIG. 2—the third opening 26 being provided on the non-visible face).

A resilient pad 28 is provided having a hole 29 for receiving a threaded screw 30 therethrough. Screw 30 threads into hole 25 in member 12 as seen in FIG. 3. An apertured washer 31 (FIG. 2) is provided adapted to receive screw 32 therethrough. Screw 32 is threaded into hole 24 in member 12 as seen in FIG. 3. Washer 31 is preferably the same outer diameter as the greater outer diameter of member 12. Pad 28 may be of rubber or the like having a central recessed portion 33 and of an outer diameter substantially the same as the greater diameter of member 12. A coiled spring 34 is provided (FIG. 2) as is a detent 35 having a rounded or domed head 36. As seen in FIG. 3, spring 34 is adapted to be inserted into hole 23 with detent 35 inserted therein abutting against spring 34 and biasing the same. Detent 35 provides friction when member 12 is moved within member 11.

A threaded headless shank 37 (FIG. 2) is provided along with a pin 38. Shank 37 is threaded into a threaded hole 39 formed in portion 21 of member 11 (FIG. 3) leaving a portion protruding therefrom. A hole 40 is drilled through both portion 21 and shank 37 and pin 38 is hammered or otherwise driven therein. This prevents rotation of shank 37. A plug 56, which may be of wood, see also FIG. 2, is inserted and glued into hole 40 closing it off as seen in FIG. 3.

A threaded wing nut 42 (FIG. 2) is provided along with a sleeve 43. Sleeve 43 has a throughbore 44 and a threaded boss 45 (FIG. 3) on its exterior having a threaded hole 46 adapted to receive therein threaded shank 47 of wing nut 42.

Referring again to FIG. 2, a plurality of oblong inserts, such as inserts 48, 49 and 50, are provided receivable in oblong holes 26 as will be discussed. Inserts 48, 49 and 50 may be of a plastic material such as acetal plastic.

A closure plug 51 (FIG. 2) is provided having an enlarged head 52 at one end and a protruding shank portion 53 threaded on its interior 54 (FIG. 3). An elongated pin 55 (FIG. 2) is provided.

The parts shown in FIG. 2 may be assembled into three components, as will be discussed. The three components can then be quickly and easily set up to provide a portable armrest, then disassembled just as quickly for transportation and storage.

Thus, looking at FIGS. 2 and 3, shank 37 is threaded into hole 39 of member 11 and a hole 40 is drilled through member 11 and shank 37. Pin 38 is then driven into the drilled hole 40 and the hole 40 is closed off by plug 56. This prevents shank 37 from moving. Washer 31 and screw 32 are assembled to member 12 as previously discussed. Washer 31 being of greater diameter than the lesser diameter of hexagonal member 12, abuts against plastic inserts 48, 49, and 50 when member 12 is extended, thus preventing member 12 from being pulled out of member 11. Spring 30 is used to assemble pad 28 to the other end of member 12. Spring 34 is placed in hole 23 and detent 35 is placed over spring 34 and held in position while member 12 is inserted, the end with hole 23 being inserted first, inside of member 11.

The three plastic inserts 48, 49, and 50 are placed into holes 26 (from the outside of member 11) and sleeve 43 is placed over the end of member 11 until inner wall 44 encircles inserts 48, 49, and 50 and traps them between inner member 12 and sleeve 43. A mutual nail or pin 41 is now hammered or driven through sleeve 43 and into outer member 11 securing sleeve 43 thereto and preventing movement on member 11.

Thumb screw 42 is now threaded into boss 45 and tightened thus tightening inserts 48, 49 and 50 in place.

Plug 51 is preassembled to support 13. For example, as seen in FIG. 3, the body portion 53 of plug 51 is inserted into a hole 57 preformed in support 13. A hole is then drilled through body portion 53 and into support 13. Pin 55 is now inserted into this hole and this prevents plug 51 from rotating with respect to support 13. This also serves to align the interconnection of supports 13, 14. Thus, the supports 13, 14 are first interconnected as discussed, plug 51 being preinstalled on support 13, and shank 37 is threaded into body portion 53 of plug 51.

The final installed position is shown in FIG. 1. Thumbscrew 42 can be selectively loosened and tightened to vary the overall length of telescoping members 11, 12. Supports 13, 14 provide a flat horizontal bench for meditating.

Thus, only three components must be assembled or disassembled. That is, support 13 with plug 51 preinstalled thereon is a first component, support 14 (second component), and interconnected telescoping members 11, 12 (third component). The device 10 can be quickly and easily transported or stored, then set up for use.

Any suitable materials may be used, such as wood or plastic for members 11, 12 and supports 13, 14. These parts may be coated with veneer for appearance sake, if desired. Plug 51 may be coated with an epoxy powder, if desired, and of any suitable color. Inserts 48 to 50, and detent 35, may be of any suitable plastic, such as an acetal-type plastic for good frictional or sliding movement.

Any suitable dimensions may be Used. For example, members 11, 12 may be about 12½" in length. Supports 13, 14 may be about 14" long, about 2⅞" at their widest width, and about ⅝" in thickness at their thickest point. Member 11 may be about 1⅛" in outer diameter and about ⅞" in inner diameter. Member 12 may be about ¾" in diameter. Thus, the overall length of interconnected supports 13, 14 is about 26", the device 10 is adjustable from about 14" to 24" and may be light in weight, e.g., about 1 lb., 3 oz., if light wood or plastic is used.

Device 10 is thus a simple, functional armrest support consisting of three pieces or components that are easy to assemble and to take apart for travel or storage. It may be made entirely of fine hardwood and may be hand-finished in a natural wood color using a light Danish oil sealer. The center brace or telescoping members 11, 12 adjust easily and silently to provide the correct height for meditation supporting one's arms during meditation.

Although a particular embodiment of the invention has been disclosed, variations thereof may occur to an artisan and the scope of the invention should only be limited by the scope of the appended claims.

We claim:

1. A portable detachable meditation armrest support comprising:

a first elongated member having a hollow interior wall and a threaded shank protruding from one end thereof;

a second elongated member telescopingly receivable in the hollow interior wall of said first elongated member thereby forming a single monopode support;

a pair of elongated generally planar armrest supports, one of said armrest supports having a threaded plug at one end receivable in a hole in the other of said armrest supports, said armrest supports, when interconnected by said plug, forming a flat planar armrest surface lying in a single plane, said threaded shank on said first member being threadably receivable in said threaded plug; and telescoping adjusting means associated with said first and second members for adjusting the overall length thereof.

2. In the support of claim 1 wherein one of said planar armrest supports abuts against the other of said planar armrest supports without any gap therebetween.

3. In the support of claim 2 wherein one end of each of said pair of planar armrest supports is tapered, said tapered end of one support mating with the tapered end of the other support forming a gapless joint therebetween and said planar armrest surface.

4. In the support of claim 1 wherein said threaded plug is fixedly mounted to said planar one of said armrest supports.

5. In the support of claim 4 wherein said threaded plug includes an enlarged head at one end and a threaded shank portion extending therefrom, and a pin extending through the threaded shank portion of said plug and into said one of said planar armrest supports in a direction generally normal to the elongated axis of said threaded shank portion.

6. In the support of claim 1 wherein a washer having an outer diameter greater than a diameter of said second member and is secured to one end of the second member to be received in said first member for preventing the second member from being pulled out of the first member when assembled.

7. In the support of claim 6 wherein a cushioning pad is fixed to the other end of said second member.

8. In the support of claim 1 wherein said telescoping adjusting means includes a spring biased detent mounted in a hole partway through said second member adjacent the end thereof receivable in said first member, said detent normally abutting against the interior wall of said first member under its spring bias, said detent providing friction when said first member is moved within said second member.

9. In the support of claim 8 wherein said telescoping adjusting means includes at least one hole provided through the outer wall of said first member, at least one plastic insert mounted in said hole, and a sleeve encircling said hole, said sleeve having a threaded nut portion on the exterior thereof and a threaded adjustable bolt shank receivable in said nut portion bearing against said insert.

10. In the support of claim 9 including a thumbscrew fixed to said bolt shank for adjusting the same.

11. In the support of claim 9 wherein three such holes are provided with an insert in each of said holes.

12. In the support of claim 11 wherein said holes and said inserts are oblong.

13. In the support of claim 12 wherein said first and second members are hexagonally shaped in outer configuration and said interior wall is rounded.

14. In the support of claim 9 wherein said sleeve is fixedly secured to said first member.

15. In the support of claim 1 wherein said first and second members are hexagonally shaped in outer configuration and said interior wall is rounded.

* * * * *